(12) United States Patent
Fernandez

(10) Patent No.: US 6,854,869 B1
(45) Date of Patent: Feb. 15, 2005

(54) LED FIBER OPTIC ILLUMINATED VEHICLE SEAT COVER

(76) Inventor: Robert Fernandez, 8620 NW. 190 Ter., Miami, FL (US) 33015

(*) Notice: Subject to any disclaimer, the term of this patent is extended or adjusted under 35 U.S.C. 154(b) by 42 days.

(21) Appl. No.: 10/143,297

(22) Filed: May 10, 2002

(51) Int. Cl.$^7$ .................................................. B60Q 1/00
(52) U.S. Cl. ........................ 362/488; 362/483; 362/511; 362/131; 362/554; 297/184.17
(58) Field of Search ................................. 362/483, 511, 362/131, 555, 554, 488, 560, 570; 297/184.17

(56) References Cited

U.S. PATENT DOCUMENTS

| | | | |
|---|---|---|---|
| 4,234,907 A | 11/1980 | Daniel | |
| 5,709,448 A | * 1/1998 | Jennings et al. | ............ 362/581 |
| 6,016,038 A | 1/2000 | Mueller | |
| 6,126,233 A | * 10/2000 | Gaetano et al. | ......... 297/217.6 |
| 6,302,570 B1 | 10/2001 | Petell | |
| 6,577,794 B1 | * 6/2003 | Currie et al. | ............... 385/101 |

\* cited by examiner

*Primary Examiner*—Sandra O'Shea
*Assistant Examiner*—Bertrand Zeade
(74) *Attorney, Agent, or Firm*—Alvin S. Blum

(57) ABSTRACT

A seat cover or seat covering for original equipment on a vehicle, or for retrofitting on a vehicle seat provides an ornamental elongate light. The light is provided by one or more light emitting diodes (LEDs) that are optically coupled to a fiber optic bundle. The bundle is affixed to the surface of the cover may be disposed in a variety of configurations, such as trim, logo, insignia, or script, as desired. The LEDs may be energized directly from a battery or programmed to emit various colors simultaneously or sequentially in a selected time program for enhanced decorative effect.

9 Claims, 3 Drawing Sheets

LED FIBER OPTIC ILLUMINATED VEHICLE SEAT COVER

This invention relates to vehicle seats and vehicle seat covers having luminous decoration provided by one or more light emitting diodes coupled to a fiber optic bundle.

BACKGROUND OF THE INVENTION

Light emitting diodes can be used to provide interesting visual effects including multiple colors and timing such as disclosed in U.S. Pat. No. 6,016,038 issued Jan. 18, 2000 to Mueller et al. U.S. Pat. 6,302,570 issued Oct. 16, 2001 to Petell et al. teaches coupling a fiber optic bundle to the LED for special visual effects. U.S. Pat. No. 6,126,233 issued 10/3/00 to Gaetano et al. teaches LEDs on a child safety seat to illuminate the occupant. LEDs have many advantages for use in motor vehicles; they are easily powered by the vehicle battery; they can produce very attractive colors and timing effects; and they are inexpensive. It would be useful to employ LEDs coupled to fiber optics to provide special attractive illumination of motor vehicle seats. U.S. Pat. No. 5,709,448, issued Jan. 20, 1998 to Jennings teaches a woven fiber optic panel on the upper edge of a flap pocket on the back of a vehicle seat. It is lit by a remote light source via a fiber optic cable. It illuminates the pocket and reflects off the seat back to light up the area behind the seat.

SUMMARY OF THE INVENTION

It is an object of the instant invention to provide motor vehicle seat coverings that are provided with attractive illumination effects from one or more light emitting diodes (LEDs) that are coupled to a fiber optic bundle that is disposed on the covering so as to emit light in an elongate pattern on the covering that is visible from in front of the seat. The seat covering of the invention may be supplied at the time of vehicle manufacture, or as a separate seat cover to be mounted onto the vehicle seat at a later time. The LEDs may emit various colors and be actuated in various sequences, as desired.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
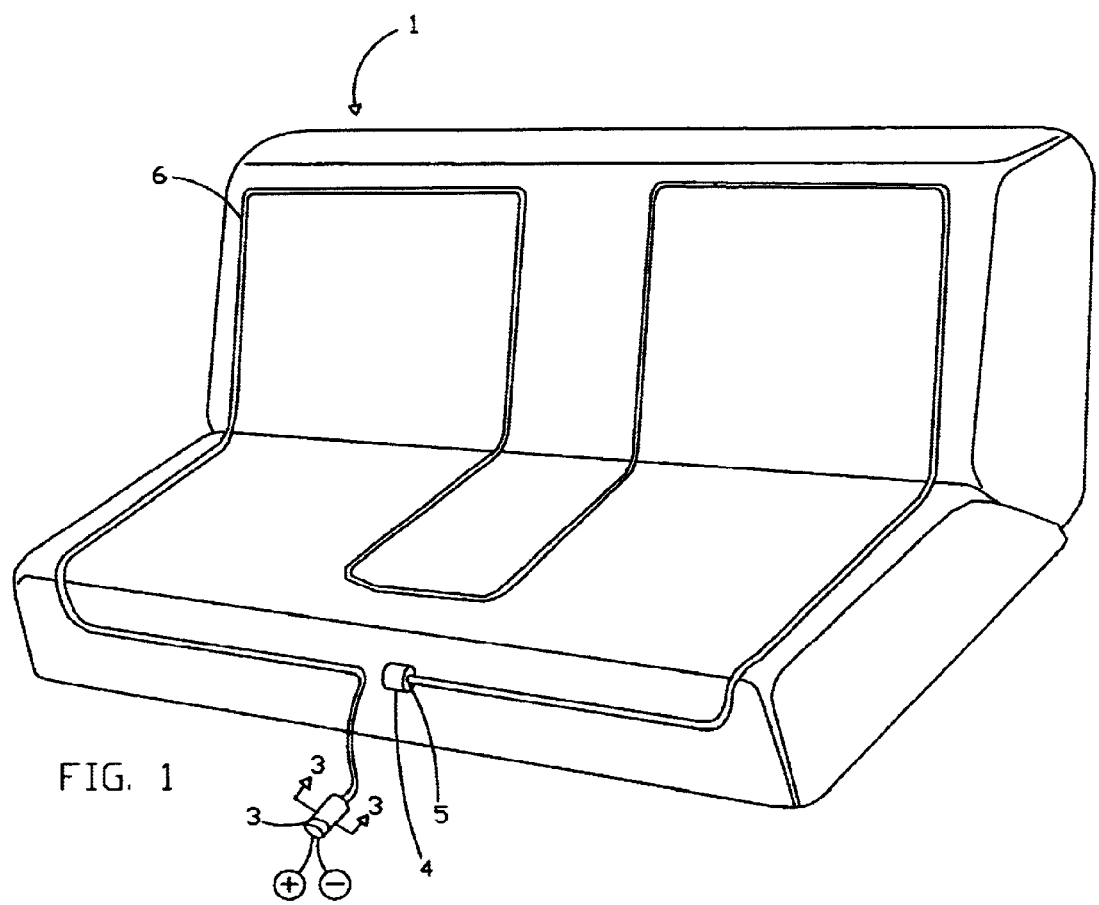
FIG. 1 is a perspective view of a vehicle seat covering of the invention for two passengers, as it might be supplied by the vehicle manufacturer.
Figure 3:
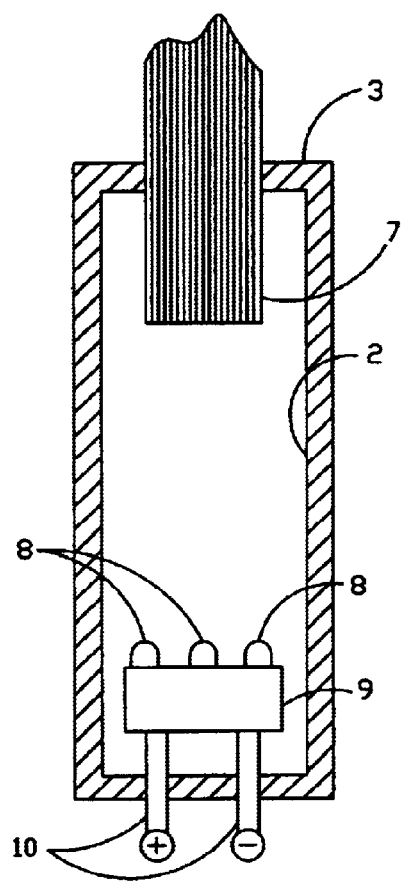
FIG. 3 is a sectional view taken through line 3—3 of FIG. 1.

Referring now first to FIGS. 1 and 3, a seat covering of the invention 1 for two passengers, as it might be supplied by the vehicle manufacturer, is provided with a luminous decorative assembly. The decorative assembly comprises an elongate fiber optic bundle having an elongate linear body 6 affixed to the surface of the covering. The bundle has a distal end 5 provided with a reflector 4 to reflect light back into the bundle. The proximal end 7 is affixed to a light source housing 3 having an inner reflective surface 2 so that all the emitted light is fed to the fiber bundle. A plurality of LEDs 8 that may emit many colors are excited by electric power connecting means 9 that receives battery power through wires 10. Connecting means 10 may be a simple switch or a programmed power feed to actuate the different colors in a particular pattern or time relationship. It may also be programmed to emit light in relation to certain vehicle conditions, such as braking, exceeding the speed limit, or in synchrony with music from the sound system. The elongate body, or a selected portion thereof, is constructed to leak light along its path, such as by disturbing the cladding, as is well known in the art. This results in a line of light. In this case, it is arranged to provide a lighted trim of the seats. The body 6 may be configured to create other designs, such as logos, insignia, and script (not shown), for example. This is a very simple and inexpensive means of providing elegant decoration.

Figure 2:
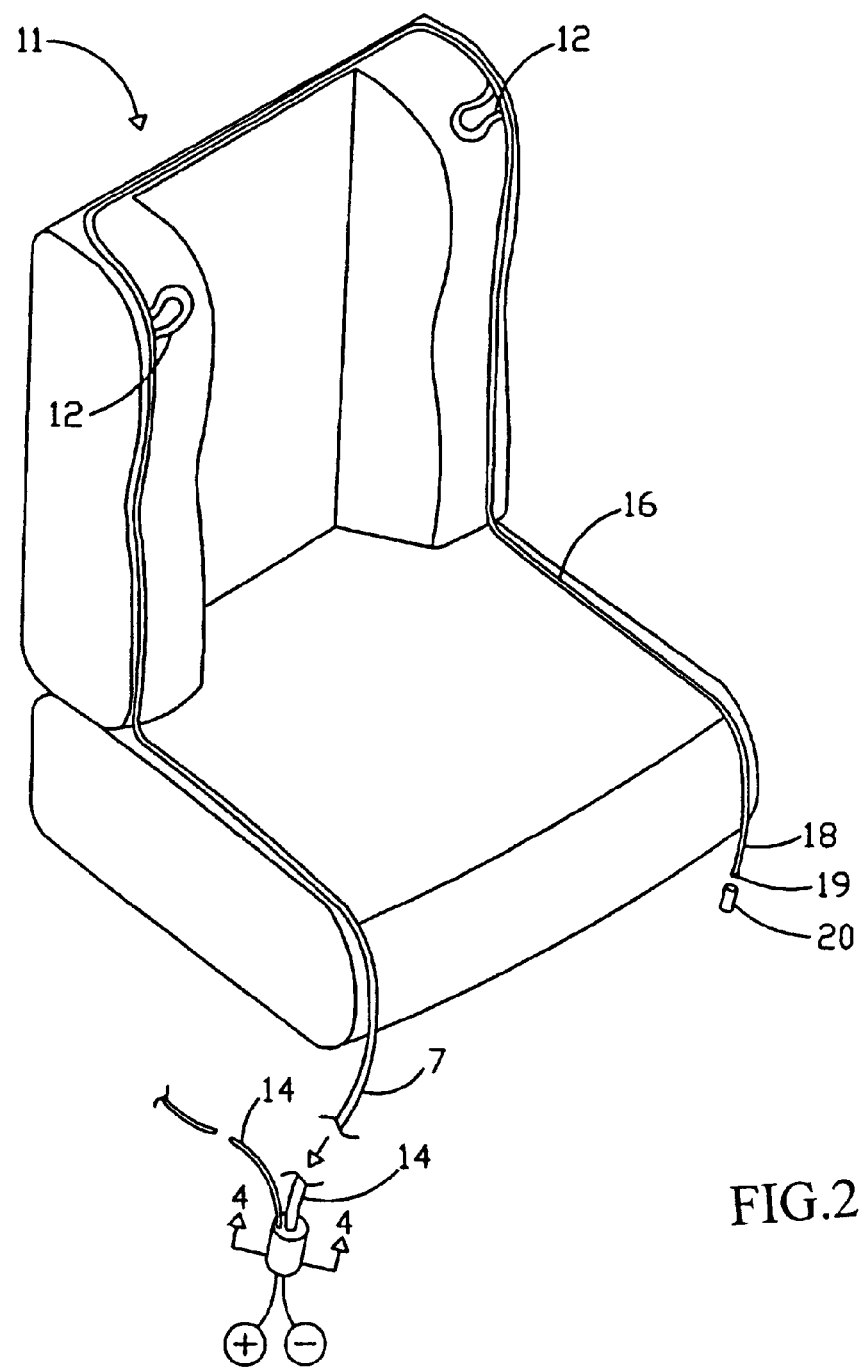
FIG. 2 is a perspective view of anther embodiment of a seat covering of the invention for retrofitting on an existing vehicle seat.
Figure 4:
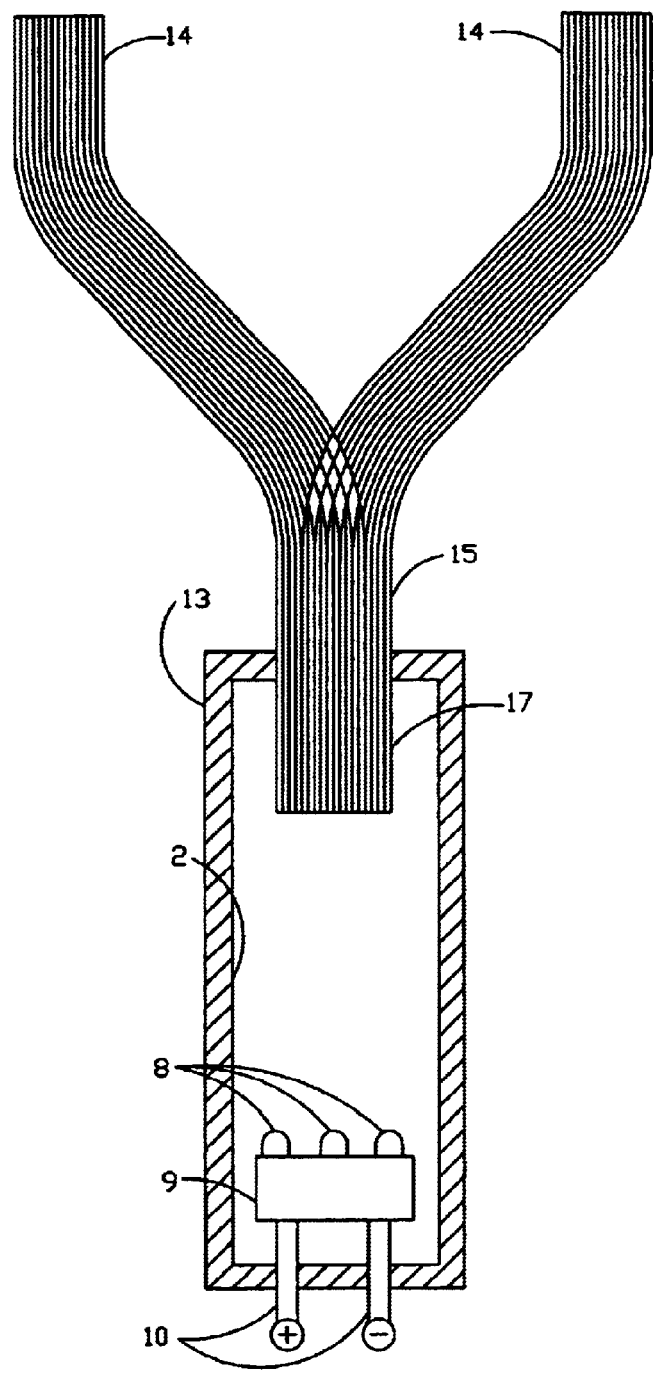
FIG. 4 is a sectional view taken through line 4—4 of FIG. 2.

Referring now to FIGS. 2 and 4, another embodiment of the invention is shown for a seat cover 11 that is for retrofit mounting on a vehicle seat. In this case, the elongate linear body 16 of the fiber optic bundle is affixed to the cover surface to provide a luminous trim and also is bent to define decorative loops 12. The proximal end 7 is operatively connected to a light source housing 13. A plurality of LEDs 8 that may emit many colors are excited by electric power connecting means 9 that receives battery power through wires 10. A fiber optic bundle 15 has a proximal end 17 positioned within the housing 13 to receive light from the LEDs 8 directly, or reflected off the reflective coating 2. The fibers are divided into two separate fiber optic bundles 14. The proximal end 7 of the linear body 16 may be contiguous with one of the two separate ends 14, or may be attached thereto by an optical connector. The distal end 18 of the fiber optic bundle is provided with a removable reflector 19. The reflector may be removed and replaced with optical coupler 20 to the fiber optic bundle on another seat cover.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention

What is claimed is:

1. A covering with a light assembly for a vehicle seat, the covering comprising:
   a) at least one LED;
   b) electric power connecting means for providing electric energy to the at least one LED;
   c) a fiber optic bundle having a distal end, an elongate linear body, and having a proximal end fixed so as to receive light emitted by the at least one LED,
   d) a reflector attached to the distal end;
   e) the bundle constructed to emit light along at least a portion of its length;
   f) the body affixed to the covering so as to produce a pleasant visual effect when lit by the at least one LED and the lit fiber optic bundle is viewed from in front of the seat.

2. The covering according to claim 1, in which the reflector is removably attached to the distal end, and further comprising a connector for optically coupling the distal end to another fiber optic bundle for illuminating another seat covering.

3. The covering according to claim 1, in which the electric power connecting means comprises a facility for changing the color output from the at least one LED.

4. The covering according to claim 3, in which the electric power connecting means further comprises a facility for changing the time relationship of the light emission.

5. The covering according to claim 1, in which the electric power connecting means comprises a facility for changing the time relationship of the light emission.

6. The covering according to claim 4, in which the electric power connecting means further comprises a facility for changing the time relationship and/or the color output of the light emission in relation to certain conditions of the vehicle.

7. The covering according to claim 1, in which the fiber bundle is divided after the proximal end into at least two elongate bodies for illuminating at least two seat coverings.

8. The covering according to claim 1, for covering over an existing vehicle seat.

9. The covering according to claim 1, in which the body is configured on the covering to produce a design.

* * * * *